United States Patent [19]

Krupp

[11] 4,108,476
[45] Aug. 22, 1978

[54] PRECOMPRESSED PIPING SYSTEM FOR HANDLING CRYOGENIC FLUID

[76] Inventor: Walter H. Krupp, 9350 Bolsa Ave., #61, Westminster, Calif. 92683

[21] Appl. No.: 786,608

[22] Filed: Apr. 11, 1977

[51] Int. Cl.² .......... F16L 5/02; F16L 25/00; F16L 39/04; F16L 51/00
[52] U.S. Cl. .............................. 285/47; 285/133 R; 285/138; 285/158; 285/363; 285/DIG. 5
[58] Field of Search ............. 285/47, 187, DIG. 5, 285/133 R, 138

[56] References Cited

U.S. PATENT DOCUMENTS

| 700,378 | 5/1902 | Schmidt | 285/187 |
|---|---|---|---|
| 1,666,495 | 4/1928 | Hodgkinson | 285/187 X |
| 2,592,574 | 4/1952 | Kaiser | 285/133 R |
| 2,823,701 | 2/1958 | Burk | 285/47 X |
| 3,109,671 | 11/1963 | Braun | 285/47 X |
| 3,246,917 | 4/1966 | Martin | 285/133 X |
| 3,471,177 | 10/1969 | Garrett et al. | 285/133 R |

FOREIGN PATENT DOCUMENTS

| 211,397 | 4/1956 | Australia | 285/DIG. 5 |
|---|---|---|---|
| 544,133 | 7/1957 | Canada | 285/133 R |
| 1,276,007 | 10/1961 | France | 285/133 R |
| 1,162,142 | 1/1964 | Fed. Rep. of Germany | 285/133 R |
| 875,599 | 5/1953 | Fed. Rep. of Germany | 285/133 R |

Primary Examiner—Mervin Stein
Assistant Examiner—Carl F. Pietruszka
Attorney, Agent, or Firm—Edward A. Sokolski

[57] ABSTRACT

A piping system comprising an inner pipe for carrying fluid and an outer pipe forming a thermal insulation jacket for the inner pipe. The pipe line is formed in sections which are joined together by means of flange members in a manner so as to provide longitudinal compression of the inner pipe such that when the cryogenic fluid is run through the inner pipe and the walls of this pipe contract with the reduction in temperature, minimum stress is placed on the pipe with such contraction, thereby avoiding damage thereto or the formation of leaks therein. Each section is bent to form angulated legs, the bent or elbow portions operating to take most of the precompression. The precompression is achieved in a simple yet highly effective manner by providing a flange on the outer pipe having a circle of fastening means for use in clamping flanges on the ends of the inner pipe sections to each other and to the outer pipe flange, at the same time compressing the inner pipe.

6 Claims, 5 Drawing Figures

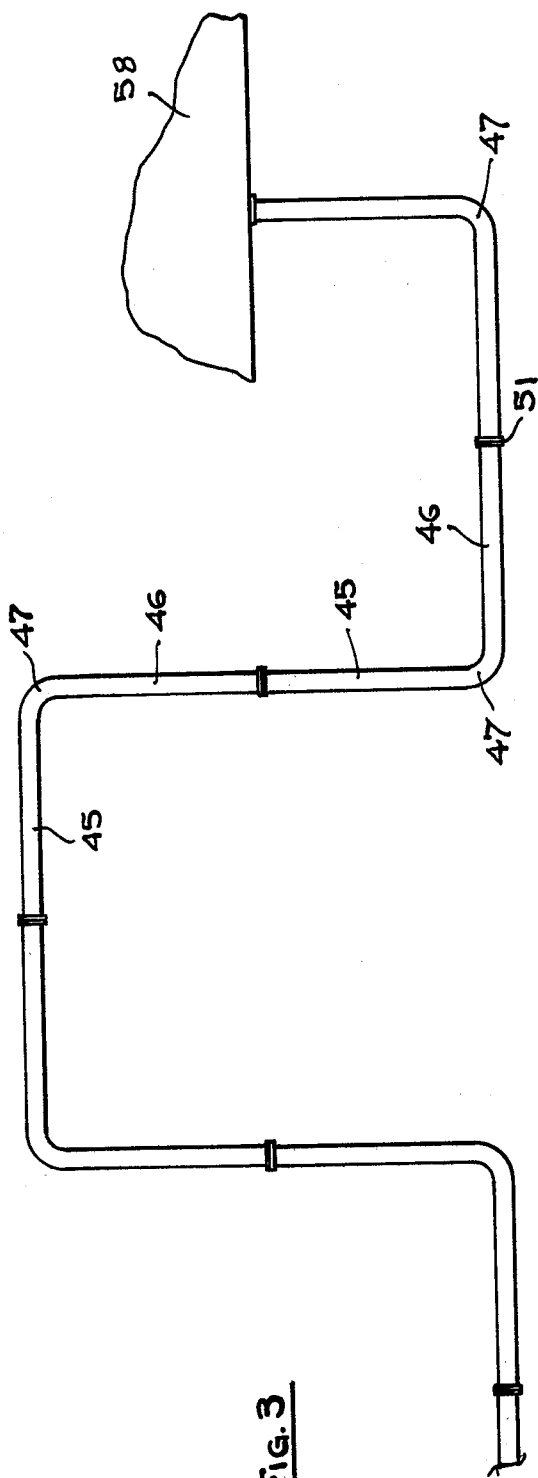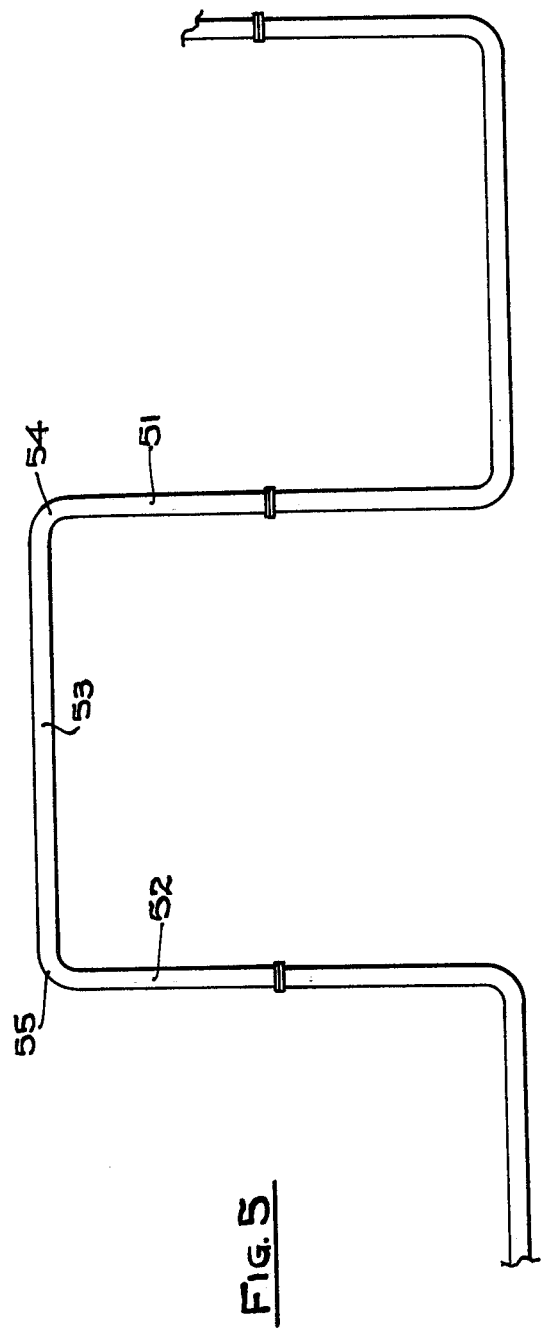
Fig. 3
Fig. 5

PRECOMPRESSED PIPING SYSTEM FOR HANDLING CRYOGENIC FLUID

This invention relates to piping systems for handling cryogenic fluid, such as in long underwater or submerged lines for liquid natural gas, and more particularly to such a system employing an inner pipe for carrying the fluid and an outer pipe forming an insulating jacket for the inner pipe, in which the inner pipe is precompressed by means of a flange bolting arrangement at the joints between sections thereof.

In pipe lines for handling cryogenic fluid, in order to avoid damage and the formation of leaks therein, it is necessary to provide some means for relieving or minimizing stress on the pipe caused by the contraction thereof in response to the extremely low temperatures of the cryogenic fluid. The most common technique for handling this situation is the provision of bellows-type expansion joints in the pipe, as described in U.S. Pat. Nos. 2,658,527, 3,068,026 and 2,785,536. The fabrication of pipes with this type of joint is quite costly. Further, it is difficult to insulate around such joints, complicating the installation problem. Also, most bellows-type joints leave much to be desired in the way of reliability, and are prone to breakage and the formation of leaks because of their thin walls. Other types of expansion joints used in prior art systems which may not have many of the aforementioned shortcomings have the disadvantage of being highly expensive in their fabrication, requiring special fabrication and shop assembly of the pipe sections and welding in the field.

The present invention overcomes the aforementioned shortcomings of the prior art by providing a simple means for precompressing the pipe sections without going to any special pipe structures (i.e., using conventional piping structure and joints). This end result is achieved and may be accomplished in the field by virtue of a unique coupling flange arrangement between pipe sections, the flanges themselves being of a relatively conventional nature.

It is therefore an object of this invention to make for a more economical cryogenic piping system to aid in offshore unloading of liquid natural gas and subsequent overland or underground distribution.

It is a further object of this invention to provide a cryogenic piping system which is simpler in structure and more reliable than prior art systems.

Other objects of this invention will become apparent as the description proceeds in connection with the accompanying drawings, of which:

FIG. 3 is a schematic view illustrating a number of sections of line incorporating the preferred embodiment;

FIG. 4 is a side elevational view of an elbow coupler which may be used in the preferred embodiment; and FIG. 5 is a schematic view of an alternate arrangement for the line sections incorporating the preferred embodiment.

Figure 1:
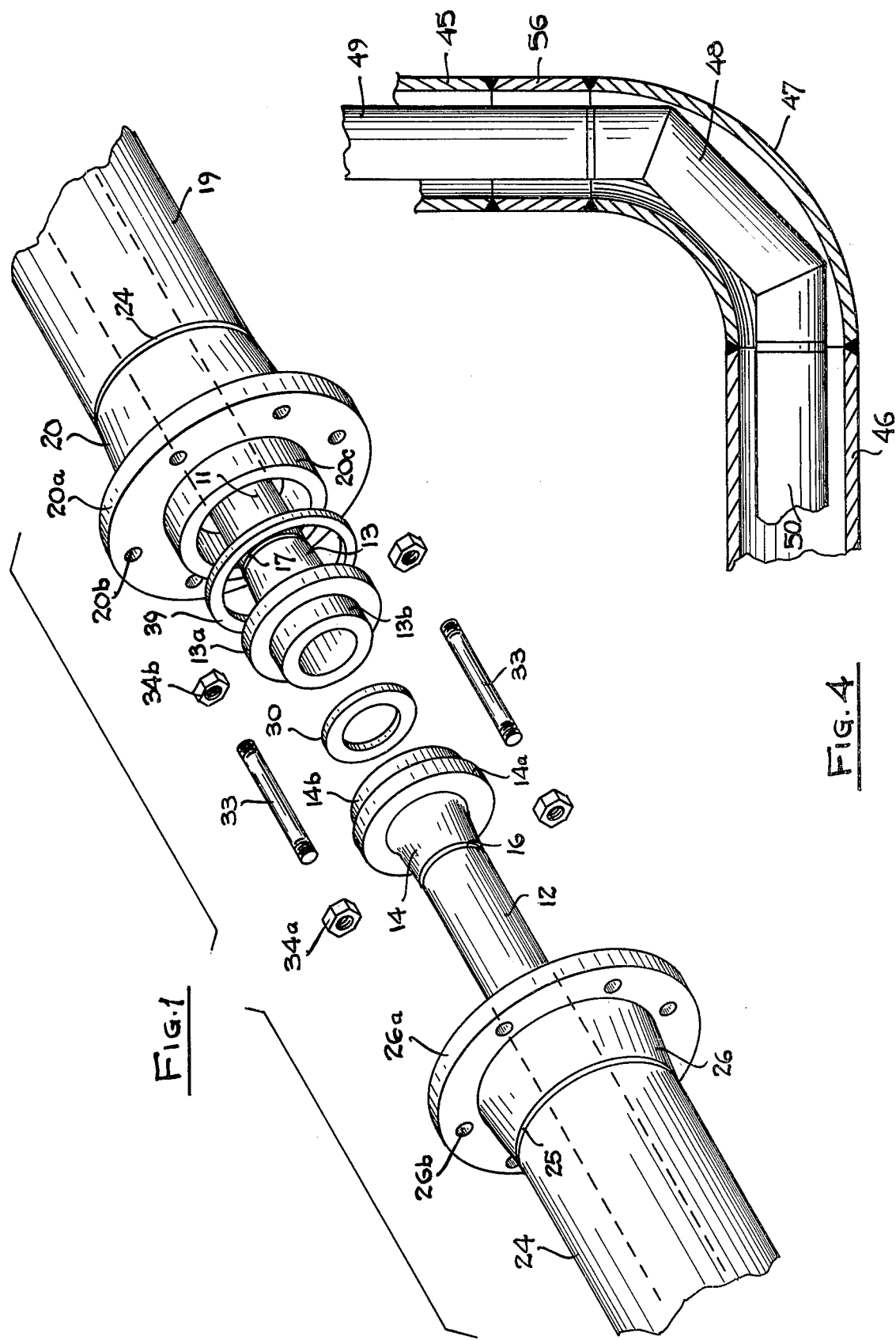
FIG. 1 is a perspective exploded view illustrating the assembly of a preferred embodiment of the invention.
Figure 2:
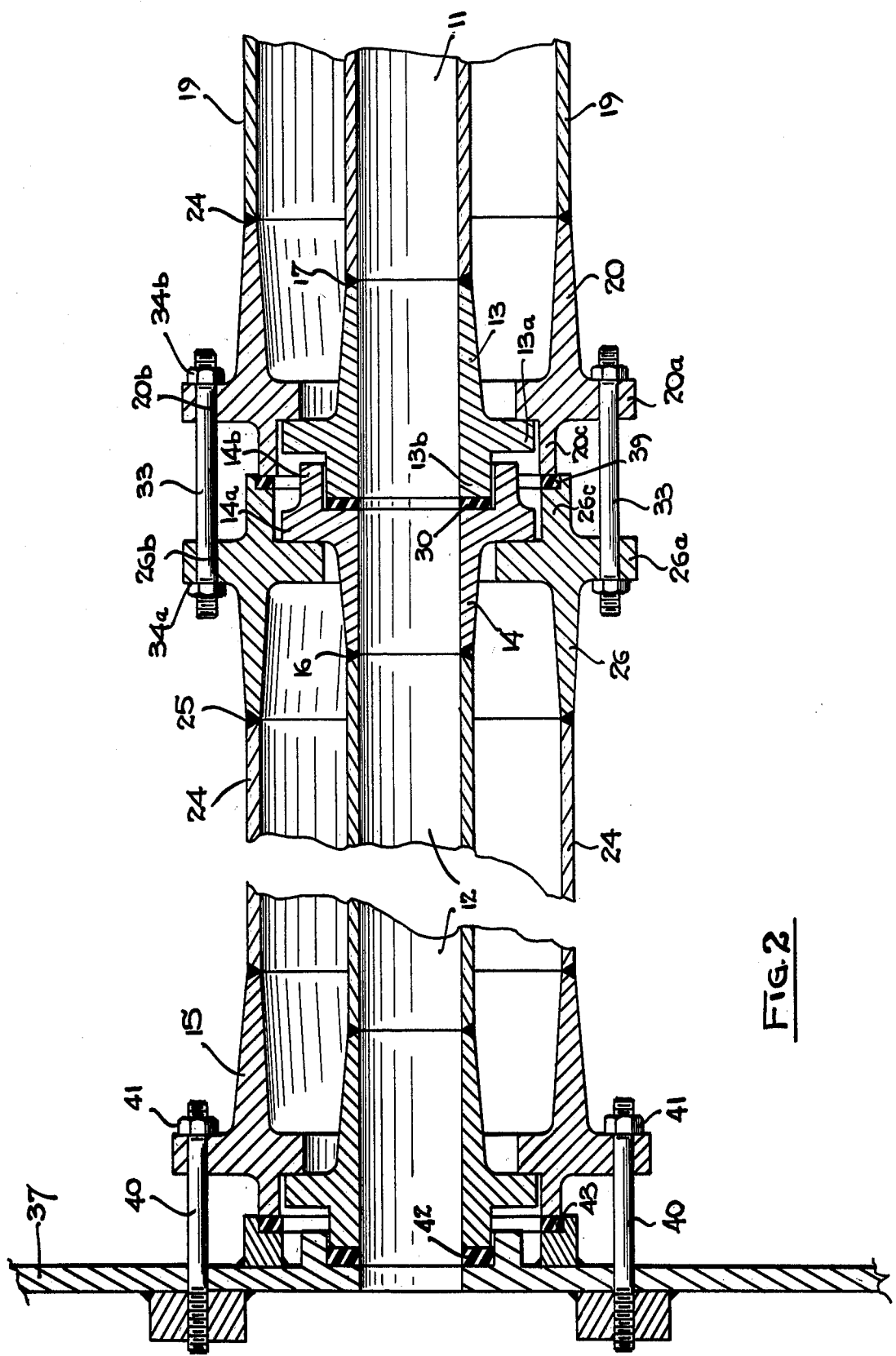
FIG. 2 is a cross-sectional view of the preferred embodiment.

Briefly described, my invention is as follows: A first inner pipe section has a coupler with a flange thereon attached to the end thereof. A first outer pipe section which forms an insulating jacket for the inner pipe section has a flange at one end thereof, with a set of fastening means which may comprise a set of threaded apertures or studs arranged in a ring. A second section of inner pipe to be joined to the first section has a coupler with a flange thereon attached to one end thereof which is generally similar to the coupler for the first inner pipe section. The coupler of the first inner pipe section has an annular sleeve thereon which fits over the end of the coupler of the second inner pipe section and abuts against the flange of the second inner pipe section. A second outer pipe section has a flange on one end thereof with apertures formed therein which correspond to the set of apertures of the first outer pipe section flange. This second outer pipe section is then tightly bolted to the first outer pipe section by means of bolts which are passed through the flange apertures, thereby tightly securing the inner pipe couplers to each other and longitudinally compressing one of the inner pipe sections. Each section of both inner and outer pipe includes at least two leg portions which are angulated with respect to each other either by virtue of an elbow joint between such leg portions or the use of pipe sections in the form of a loop; the bends operating to take most of the compression.

Referring now to the Figures, a preferred embodiment of the invention is illustrated. Inner pipe sections 11 and 12 have couplers 13 and 14 respectively, attached to the opposite ends thereof by suitable means such as welding, at joints 16 and 17. Coupler 14 outwardly tapers to flange 14a. Extending from flange 14a is annular sleeve 14b. Coupler 13 outwardly tapers to flange 13a. Extending from flange 13a is an annulus 13b which has an inner diameter substantially equal to that of pipe sections 11 and 12, and an outer diameter slightly smaller than the inner diameter of sleeve 14b. A first outer pipe section 19, which surrounds and forms a jacket for the first inner pipe section 11, has a coupler 20 attached to one end thereof by welding at joint 24. Coupler 20 tapers outwardly to flange 20a which has a plurality of threaded apertures 20b formed therein and arranged in a ring.

Surrounding and forming a jacket for second inner pipe section 12 is a second outer pipe section 24. Fixedly attached to the end of pipe section 24 by welding at joint 25 is coupler 26. Coupler 26 tapers outwardly to flange 26a, which has a plurality of apertures 26b formed therein arranged in a ring.

Pipe sections are assembled in the following manner:

Let us assume that we are assembling the very first pipe section with the first ends of the inner and outer pipe sections being attached to a tank 58, such as shown in FIG. 3. Further let us assume that the pipe sections are angulated "U" shaped forms as shown in FIG. 3. The initial inner and outer pipe sections are first connected at one end to tank 58. An elbow 47 (see FIG. 3) is located between the tank and the first joint 51. With a pipe section 40 feet in length, the rear surface of flange 13a will extend about 3 inches from the front face of flange 20a with the inner and outer pipe sections connected to tank 50 before flange 26a is joined to flange 20a. Coupler 14 is first installed on coupler 13 with annular sleeve 14b placed over annulus 13b and with flat ring gasket 30, which is preferably spirally wound, placed between the axial interface of the two couplers. Couplers 20 and 26 are then drawn tightly together by means of studs 33 which fit through apertures 26b and 20b at their opposite ends, and nuts 34a and 34b. As the flanges 26a and 20a are drawn together, the inner wall of flange 26a drives against flange 14a of the inner pipe coupler. Flange 14a in turn drives against coupler 13 with sufficient force to cause compression of the pipe section 11, most of the compression being taken up at the elbow joint 48 (see FIG. 4) of the pipe. Flat ring gasket 39 is placed between projecting rings 20c and 26c of the flanges to provide a seal for the outer jacket. The last inner and outer pipe sections 12 and 24 in the pipeline may be connected to a tank 37 or other receiving member by means of flange 15, which is bolted to the tank by means of studs or bolts 40 and nuts 41, with flat ring gaskets 42 and 43 being utilized to provide seals at the joints.

Referring now to FIG. 3, a number of sections of pipe incorporating the device of the invention are schematically shown. In order to facilitate the compression of the inner pipe, the pipe sections are formed from pairs of outer pipe section legs 45, 46 and inner pipe section legs 49, 50 which are joined together by elbow couplers 47 and 48 respectively, as can best be seen in FIG. 4. Access is afforded to facilitate assembly by employing a ring section 56 in the outer pipe which is welded in place as the last step in the assembly of the elbow. The legs 45, 46 and 49, 50 are angulated with respect to each other as shown in the exemplary embodiment by 90°, but other angular relationships may be employed such as between 90° and 120°. When the inner pipe is compressed, the elbow joint 48 operates to take most of the compression. Typically, stainless steel is utilized for the pipe sections.

Referring now to FIG. 5, an alternative way for providing bends in the pipe sections is schematically shown. The pipe sections 50 are preformed in loops, end leg portions 51 and 52 being angulated with respect to central leg portion 53. Bends 54 and 55 operate to take up the compression and in the illustrative embodiment are at 90°, but can be between 90° and 120°.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a piping system having a plurality of inner pipe sections joined together to form a conduit for carrying fluid and a plurality of outer pipe sections joined together to form an insulating jacket for the inner pipe sections, wherein the improvement includes means at each joinder between pipe sections for precompressing said pipe sections, comprising:

a first inner pipe section having a coupler including a flange attached to one end thereof, said flange having flat face and flat rear portions lying in planes substantially normal to the longitudinal axis of said first inner pipe section, said coupler further including an annulus extending from the face portion of said flange to form the unattached end of said coupler, a first outer pipe section surrounding said first inner pipe section and having a coupler including a flange attached to one end thereof, said outer pipe section flange having a flat face portion and a flat rear portion lying in planes normal to the longitudinal axis of said first outer pipe section and a set of apertures therein, said first inner pipe section being slightly longer than said first outer pipe section such that said one end of said first inner pipe section and the flange thereof extend out from said first outer pipe section beyond said one end of said first outer pipe section, a second inner pipe section having a coupler including a flange attached to one end thereof, said second inner pipe section flange having a flat face portion and a flat rear portion lying in planes substantially normal to the longitudinal axis of said second inner pipe section, said second inner pipe section coupler having an annular sleeve extending from the face portion of said second inner pipe section flange to form the unattached end of said second inner pipe section coupler, said sleeve being adapted to fit over the annulus of said first inner pipe section coupler, a second outer pipe section having a coupler including a flange attached to one end thereof, said last mentioned flange having a flat face portion lying in a plane substantially normal to the longitudinal axis of said second outer pipe section, and a set of apertures formed therein positioned and formed to mate with the apertures of said first outer pipe section, and means for clamping the flanges of said outer pipe sections together with the apertures thereof in alignment so as to draw the flat face portions of said outer pipe section flanges towards each other, the flat face portion of said second outer pipe section flange being drawn into abutment against the flat rear face of said second inner pipe section and the flat face portion of said first outer pipe section flange being drawn into abutment against the flat rear portion of said first inner pipe section, with the sleeve of said second inner pipe section coupler engaging the annulus of said first inner pipe section coupler and applying pressure thereagainst as the outer pipe section flanges are drawn towards each other, thereby longitudinally compressing the first inner pipe section.

2. The piping system of claim 1 wherein the clamping means comprises a threaded stud fitted through corresponding apertures of the flanges of said outer pipe sections and nuts engaging the ends of said studs.

3. The piping system of claim 1 wherein the apertures of said outer pipe section flanges are arranged in circle.

4. The piping system of claim 3 wherein said leg portions are formed by straight pipes joined together by elbow couplers.

5. The piping system of claim 1 wherein said pipe sections have leg portions which are angulated with respect to each other.

6. The piping system of claim 5 wherein said pipe sections are loop shaped thereby to form said angulated leg portions.

* * * * *